(12) United States Patent
Yoshida

(10) Patent No.: US 7,463,798 B2
(45) Date of Patent: Dec. 9, 2008

(54) MEMS DEVICE WITH FAILURE DIAGNOSIS FUNCTION

(75) Inventor: Satoshi Yoshida, Tama (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 458 days.

(21) Appl. No.: 11/388,033

(22) Filed: Mar. 22, 2006

(65) Prior Publication Data

US 2006/0222291 A1    Oct. 5, 2006

(30) Foreign Application Priority Data

Mar. 31, 2005    (JP)    ............................. 2005-102401

(51) Int. Cl.
  *G02B 26/08*    (2006.01)
  *H02N 2/00*    (2006.01)
(52) U.S. Cl. ........................................ 385/18; 310/365
(58) Field of Classification Search .................... 385/18; 310/365
  See application file for complete search history.

(56) References Cited

U.S. PATENT DOCUMENTS 7,302,131 B2 *    11/2007    Ma et al. ...................... 385/18

FOREIGN PATENT DOCUMENTS

| JP | 63-085413 | 4/1988 |
|---|---|---|
| JP | 2002-159098 | 5/2002 |
| JP | 2003-343449 | 12/2003 |
| JP | 2004-048187 | 2/2004 |
| JP | 2005-037885 | 2/2005 |

* cited by examiner

*Primary Examiner*—Kevin S Wood
*Assistant Examiner*—Jerry T Rahll
(74) *Attorney, Agent, or Firm*—David N. Lathrop, Esq.; Gallagher & Lathrop

(57) ABSTRACT

In order to implement an MEMS device which monitors a mechanical response characteristic of a moving part to detect a precursor of a fatal failure without needing correction of an existing control input and without adding any components, there are provided vibration detecting means 80 for detecting a micro vibration excited in a moving part 60 in one of binary switching states, a dynamic-characteristic analyzing unit which analyzes a dynamic characteristic of the moving part 60 on the basis of an output from the detection, a memory 100 which stores the analyzed data, an operation unit 110 which retrieves the stored data, compares two temporally successive pieces of data and calculates difference information between the two pieces of data, and a failure diagnosis unit 120 which performs failure diagnosis based on the difference information.

25 Claims, 6 Drawing Sheets

MEMS DEVICE WITH FAILURE DIAGNOSIS FUNCTION

TECHNICAL FIELD

The present invention relates to MEMS (Micro Electro Mechanical Systems) devices such as optical switches and, in particular, to MEMS devices with a failure diagnosis function.

BACKGROUND ART

Focusing attention on optical switches, optical switches are installed for example in nodes in a ring network constituting a Dense Wavelength Division Multiplexing (DWDM) optical communication network. Most of the optical switches installed at such nodes mechanically place and remove optical elements such as prisms or mirrors in and from light paths to change light paths. Optical switches that change light paths are used as Reconfigurable Optical Add/Drop Multiplexers (ROADMs) capable of selecting or reconfiguring light wavelengths to be dropped or added at the nodes. Optical switches can also be used as backup devices during maintenance and inspection services or failure recovery in redundant systems having a dual signal system consisting of a light path that is normally in actual use (production path) and a backup light path (backup path) that can be switched into service at long intervals. Some of these optical switches are formed on a chip in which optical and driving systems are formed as an integral piece in MEMS device fabricated by using semiconductor micromachining technology because they are provided to switch microstructure optical paths.

Optical switches shown herein are microscopic MEMS devices and include moving parts that are essential to their function. Therefore the mechanical reliability of the moving parts is especially crucial. Required mechanical reliability includes switching durability to withstand frequent switching of light paths and the switching reliability of switching operation performed after a long idle period. For example, in the case of optical switches used as above-mentioned ROADMs, an optical signal flow will frequently change, given the fact that the optical line is shared on a wavelength or time basis. Accordingly, the frequency of switching operations of a optical switch increases, which requires a high switching durability. Switching durability is also essential to optical switches used in a monitoring system that involves switching between a main signal and a monitor signal on an as needed basis. On the other hand, optical devices used as backup devices in a redundant system as mentioned above, the switching frequency is very low. Specifically, switching from a production system to a backup system may be done when the inspection or maintenance of the production system is performed, for example once a year. Therefore, the reliability of switching after a long idle period is required.

Ensuring the mechanical reliability of MEMS devices typified by optical switches which have moving parts is absolutely essential. A related-art technique for improving the mechanical reliability is a optical switch subsystem disclosed in Japanese Patent Application Laid-Open No. 2004-48187. The optical switch subsystem uses a rough motion mode or fine motion mode of the angle of mirrors as modes for controlling a optical switch, which is an MEMS device, to obtain the results of measurements of the intensity of light from a light source when a light beam from the light source is switched by the optical switch, conducts self-diagnosis based on the measurements, conducts self-diagnosis based on switching time, and performs calibration based on the result of the self-diagnosis. The document states that a switching failure can be detected through the diagnosis and the reliability and performance of an optical communication system can be improved.

However, the related art described above requires an additional light source and receiving optics (a light intensity monitor) dedicated to the self-diagnosis of the optical switch. Thus, optical switches capable of conducting self-diagnosis are equipped with an increased number of components.

Furthermore, the related-art technique is a system incorporating a optical switch premised on correction of control inputs and therefore is not applicable to optical switches currently on the marketplace that are not premised on correction of control inputs.

DISCLOSURE OF THE INVENTION

The present invention provides an MEMS device, typified by a optical switch, having a failure diagnosis function that monitors mechanical response characteristics of moving parts of the MEMS to detect a precursor of a fatal failure without practically needing to add additional components and that can be applied to failure diagnosis of MEMS devices equipped with an existing system as well, without requiring correction of control inputs.

The present invention provides a microelectromechanical systems device including: a substrate; a moving part, a fixed part, and an actuator that displaces the moving part, all of which being formed on the substrate; a control unit which drives the actuator to switch the position of the moving part between binary states; vibration detecting means for detecting a micro vibration excited in the moving part in one of the binary switching states; a dynamic-characteristic analyzing means for analyzing a dynamic-characteristic of the moving part on the basis of an output from the vibration detecting means; a memory which stores data outputted from the dynamic-characteristic analyzing means; an operation unit which retrieves data from the memory, compares two temporally successive pieces of data, and calculates difference information between the two pieces of data; and a failure diagnosis unit which performs a failure diagnosis based on the difference information outputted from the operation unit.

According to the present invention, a precursor of a fatal failure can be identified by consistently monitoring the mechanical response characteristics of moving parts of MEMS devices. The present invention does not practically increase the number of components of MEMS devices as compared with conventional MEMS devices to which the present invention is not applied, and therefore the failure diagnosis of the present invention can be applied to any existing MEMS devices in the marketplace which are not premised on correction of control inputs.

BEST MODES FOR CARRYING OUT THE INVENTION

Embodiments of the present invention will be described with reference to the accompanying drawings. Examples of precursors of fatal failures of MEMS devices include malfunctions due to stiction (friction that inhibits motion of moving parts), cracks due to fatigue, and functional deterioration due to wear. In the present embodiments, failure diagnosis is conducted by detecting and identifying such precursors prior to or simultaneously with normal driving of an MEMS device.

Figure 1:
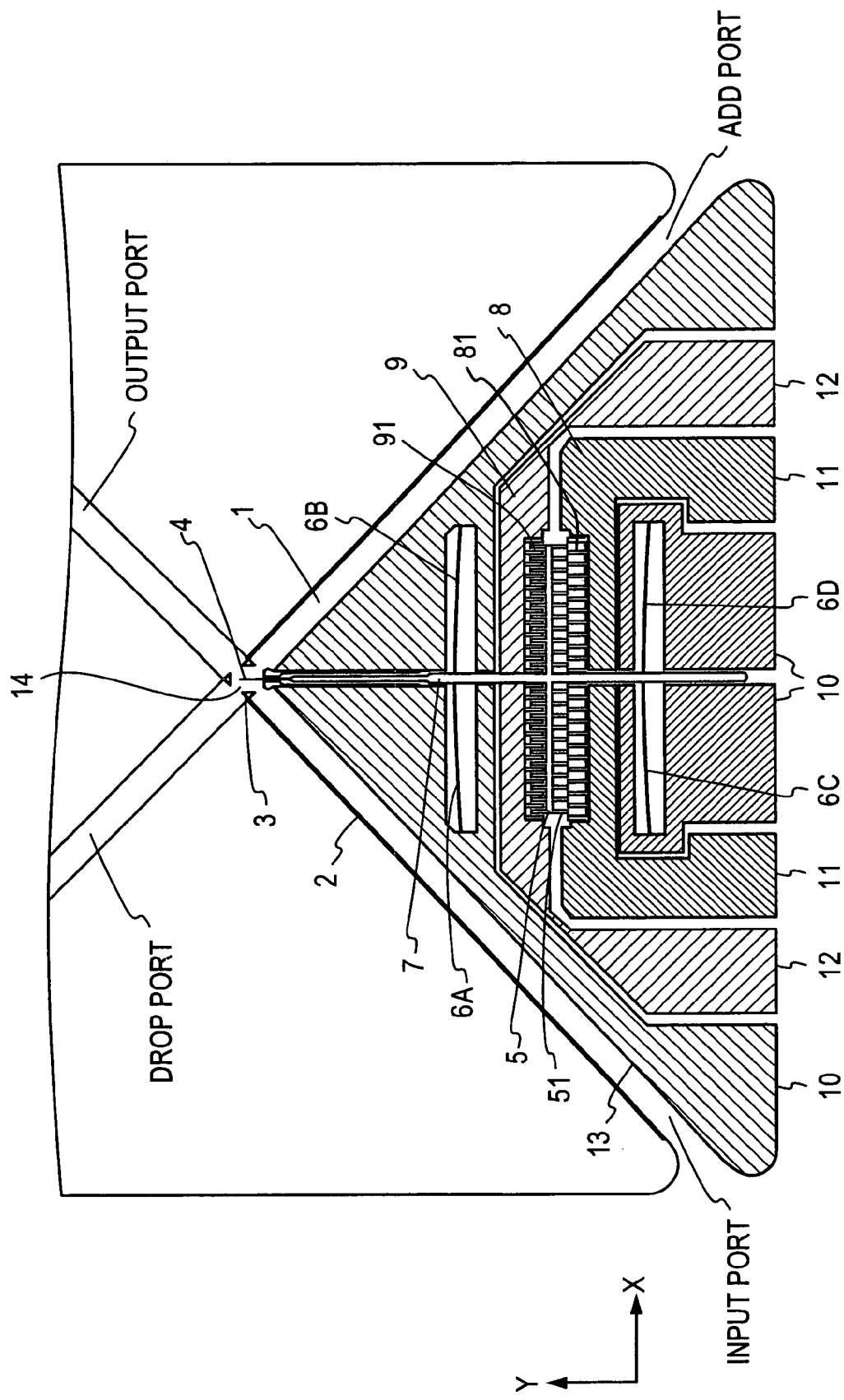
FIG. 1 is a plan view of a optical switch exemplifying the present invention.
Figure 2:
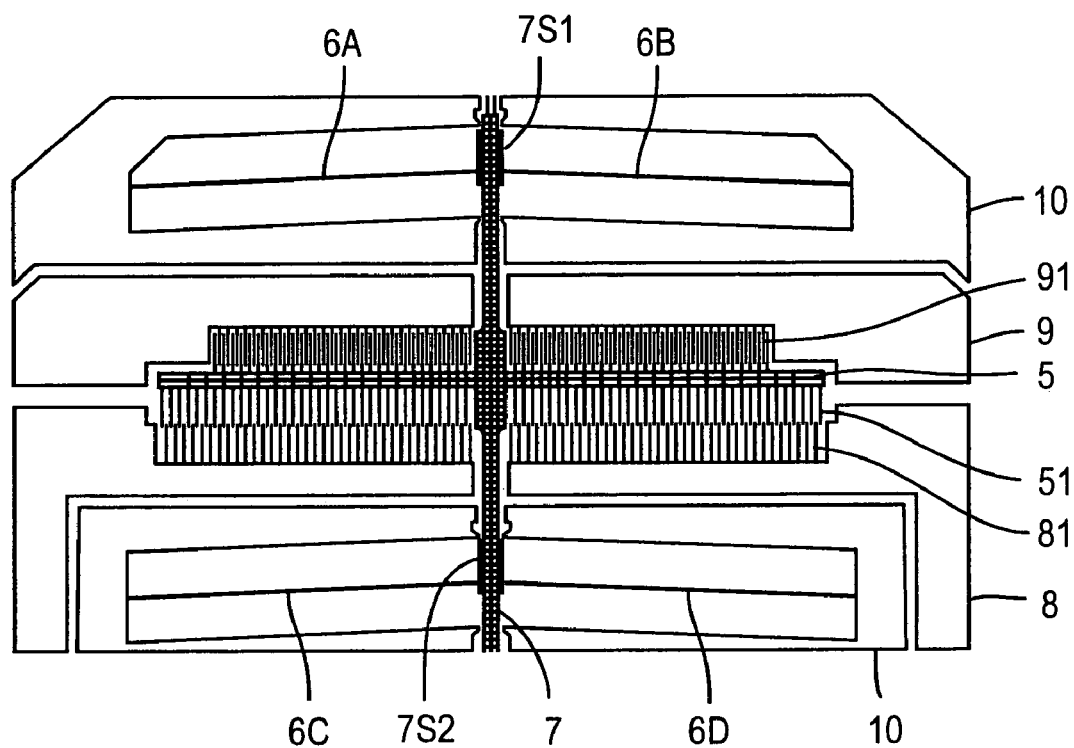
FIG. 2 is a plan view mainly showing moving parts of the optical switch shown in FIG. 1.

A optical switch, which is a typical example of MEMS devices will be described. A optical switch in the present embodiments is formed with for example a (100) SOI wafer consisting of a silicon substrate (with a film thickness of 350 μm)/silicon oxide film (with a thickness of 3 μm)/silicon device layer (with a thickness of 100 μm). FIGS. 1 and 2 are plan views of the optical switch. The optical switch is a two-dimensional structure having a uniform thickness in the depth direction (the z-direction) perpendicular to the pages of FIGS. 1 and 2. The two-dimensional structure is basically fabricated through the following steps.

1) A silicon oxide film is formed on the surface of a silicon device layer formed on the wafer described above.

2) The silicon oxide film formed in step (1) is patterned by using photolithography technology.

3) Anisotropic etching using a technique such as DRIE (Deep Reactive Ion Etching) is applied to the silicon device layer by using the patterned silicon oxide film as a mask. That is, the silicon device layer is patterned.

4) An etchant capable of selectively etching silicon oxide films is used to remove the silicon oxide embedded between the silicon substrate and the silicon device layer to release moving parts. Because different contrasts in terms of area are provided to islands of moving parts and fixed parts isolated from one another, silicon oxide below the fixed parts remains if the etching is completed within a proper period of time. That is, patterned fixed parts and moving parts are created. The structures of the fixed and moving parts will be described later.

5) The surface of regions such as mirrors and electrode pads that require metallization are metallized with a high-reflectance metal such as Au.

Thus, a optical switch has been formed on the wafer. A configuration and operation of the optical switch which is an embodiment of the present invention will be described with respect to the exemplary plan views of FIGS. 1 and 2.

In FIGS. 1 and 2, fiber grooves 1 are formed crosswise. The fiber grooves 1 have a width that is sufficiently approximate to the outer diameter of an optical fiber. Collimation fibers (not shown) having the angle-polished ends are pressed in the fiber grooves 1, the position of the optical axis is determined by using a fiber butt joint 3, and the collimation fibers pressed in the grooves are pressed against the reference plane 13 with a fiber pressing spring 2.

A mirror 4 is retractably installed in a cross waveguide portion 14 at which ends of the fibers face each other at an intersection of the fiber grooves 1. The alignment of the mirror 4 must be most precise when it is inserted in the cross waveguide portion 14 and reflects light. Therefore, the device of the present embodiment is fabricated by using the state in which the mirror 4 is inserted in the cross waveguide portion 14 as the initial form.

The mirror 4 is supported by the tip of a movable rod 7 and a movable comb 51 and a movable electrode 5 which make up an electrostatic comb actuator (sometimes simply referred to as the electrostatic actuator) are coupled to the movable rod 7. The movable rod 7 is supported in an axially movable manner by leaf-spring hinges 6A, 6B, 6C, and 6D provided on both sides of the electrostatic actuator along the axis of the actuator. The optical switch must perform binary control (binary control by normal driving) between a state in which the mirror 4 is inserted in the cross waveguide portion 14 and a state in which the mirror 4 is retracted from the cross waveguide portion 14. Accordingly, the leaf-spring hinges 6A, 6B, 6C, and 6D deflect toward one side and remain in a first stable state while the mirror 4 is inserted. They deflect toward the other side and remains in a second stable state while the mirror 4 is kept retracted. The set of components such as the mirror 4, the movable electrode 5 of the electrostatic actuator, and the leaf-spring hinges 6A, 6B, 6C, and 6D is coupled together through the movable rod 7 and in its entirety constitutes a moving part.

Fixed combs 81 and 91 are provided against the movable comb 51 of the electrostatic actuator in such a manner that the combs 81 and 91 engage each other on both sides of the movable comb 51. The fixed comb 81 is coupled to a first fixed electrode 8 and the fixed comb 91 is coupled to a second fixed electrode 9. Provided for the first and second electrodes 8, 9 are electrodes 11, 12, which act as switching terminals for applying a voltage to these electrodes or decreasing the voltage to a ground voltage. An anchor 10 is formed around the movable comb 51, movable electrode 5, fixed combs 81, 91, first and second fixed electrodes 8, 9, and the leaf-spring hinges 6A, 6B, 6C, and 6D, with the movable rod 7 being at the center. The fixed combs 81 and 91 of the electrostatic actuator, the first and second fixed electrodes 8 and 9, and the anchor 10 make up a fixed part.

The fixed part including the fixed combs 81, 91 of the electrostatic actuator, the first and second fixed electrodes 8, 9, and the anchor 10 is fixed to the silicon substrate through an insulator layer (silicon oxide film). On the other hand, the moving part including the movable rod 7, the movable comb 51, and the movable electrode 5 is supported by the four leaf-spring hinges 6A, 6B, 6C, and 6D in such a manner that it floats over the silicon substrate. Accordingly, when the four leaf-spring hinges 6A, 6B, 6C, and 6D are bent, the moving part is placed in the upper or lower position in the FIGS. 1 and 2, thus being placed in the first or second stable state described above. That is, when the leaf-spring hinges 6A, 6B, 6C, and 6D are bent upward in the figures and held at this position, the optical switch is in the first stable state in which the mirror 4 is inserted in the cross waveguide portion 14; when they are deflected downward in the figures and held at this position, the optical switch is in the second stable state in which the mirror is retracted from the cross waveguide portion 14. In doing so, two thickened portions of the movable rod 7 where the width of stoppers 7S1 and 7S2 shown in FIG. 2 is increased, can collide against a wall of the anchor 10, which belongs to the fixed part, thereby acting as a stopper arrangement that limits both ends of the range of movement of the movable rod 7 along the axis of the rod 7.

A basic operation of normal driving of the optical switch according to the present embodiment will be described below. In the initial form immediately after the fabrication of the optical switch (the first stable state), the mirror 4 stays in the cross waveguide portion 14. At this time, light entering from an Input port shown in FIG. 1 is reflected by the mirror 4 and guided to a Drop port. Similarly, light entering through an Add port is reflected to an Output port. When a voltage is applied to the first fixed electrode 8 through the electrode 11 while the anchor 10, the second fixed electrode 9, and the electrode 12 which are electrically connected to the moving part through the leaf-spring hinges 6A, 6B, 6C, and 6D are being grounded, electrostatic attraction occurs between the fixed comb 81 of the first fixed electrode 8 and the movable comb 51 of the movable electrode 5. If the attraction is greater than the force that retains the first stable state, the leaf-sprint hinges 6A, 6B, 6C, and 6D are placed in the second stable state, and the state is self-retained because of the deflection of the leaf-sprint hinges 6A, 6B, 6C, and 6D even when power supply is removed. At this time, the mirror 4 is retracted from the cross waveguide portion 14. Therefore, light entering through the Input port is directly guided to the Output port or the light entering through an Add port is guided to a Drop port. On the other hand, when a voltage is applied to the second fixed electrode 9 through the electrode 12 while the anchor 10, the first fixed electrode 8, and the electrode 11 are being grounded, electrostatic attraction occurs between the fixed comb 91 of the second fixed electrode 9 and the movable comb 51 of the movable electrode 5. If the attraction is greater than the force retaining the second stable state, the first stable state is reentered. Thus, by applying a predetermined voltage and a ground voltage alternately to the first fixed electrode 8 and the second fixed electrode 9, switching between the second and first stable state can be achieved. In this way, to switch between the first and second stable states, a constant voltage is applied to one of the electrode 11 and the electrode 12 and the other is grounded, in a rectangular waveform. In the first or second state after completion of switching, the anchor 10, the electrode 11, and the electrode 12 are all grounded. Thus, switching of the optical switch that is placed in the first or second stable state by the retention force of the leaf-spring hinges 6A, 6B and 6C, 6D can be accomplished as described above and thus the normal driving of the optical switch can be properly accomplished.

According to the present invention, a precursor of a fatal failure in an MEMS device is detected and identified prior to or simultaneously with normal driving of the MEMS device, as stated earlier. In the present embodiment, driving for failure diagnosis is performed to actively generate a micro vibration for failure diagnosis in a moving part of a optical switch in the first or second stable state, or a damped micro vibration that is induced by switching as normal driving is used. By detecting a micro vibration (including damped vibration) of the moving part and analyzing dynamic characteristics, failure diagnosis can be made.

Figure 3:
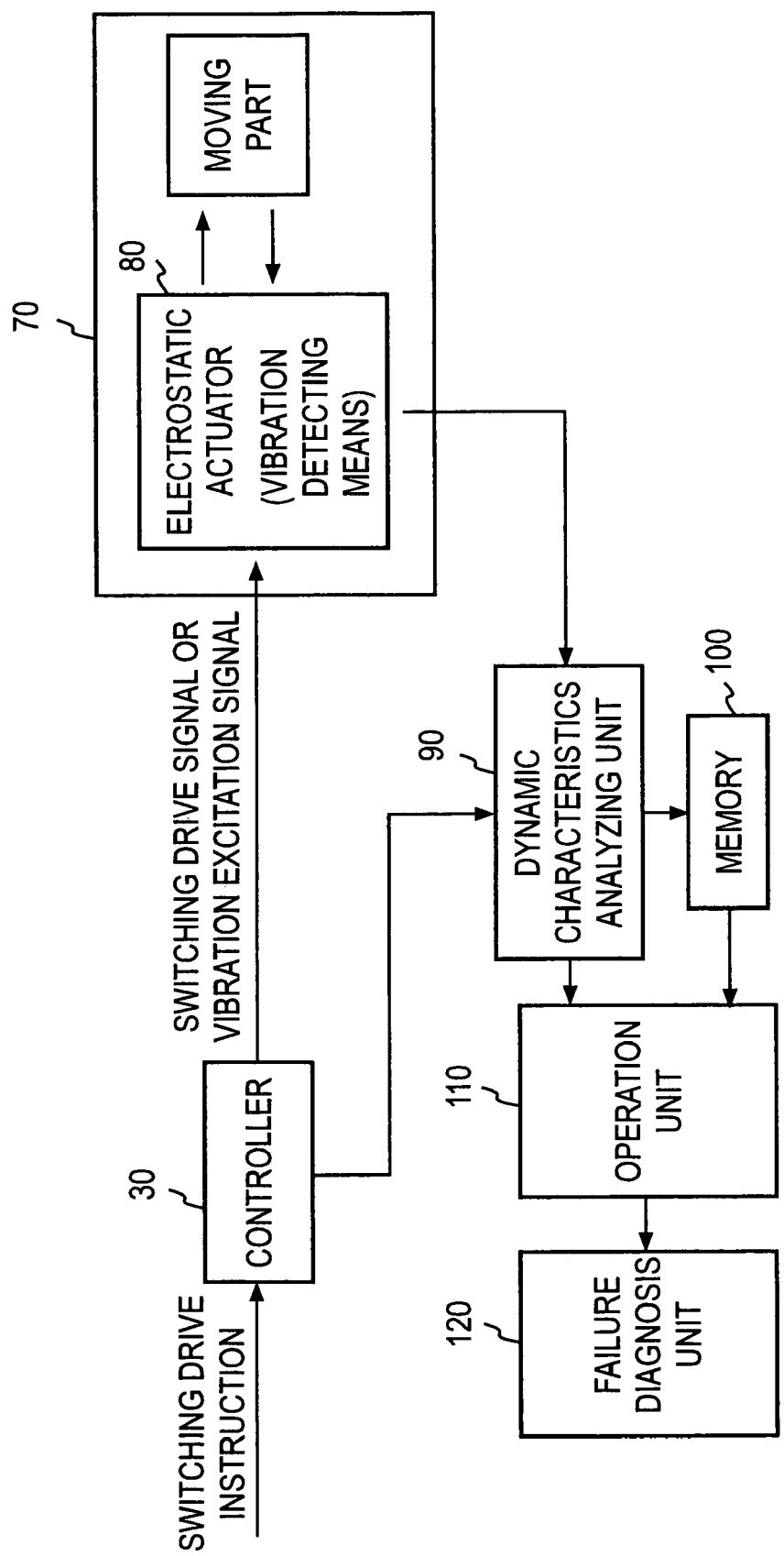
FIG. 3 is a block diagram of an embodiment of the present invention.

FIG. 3 is a block diagram showing an MEMS device with a failure diagnosis function according to the present embodiment. The MEMS device shown in the block diagram is a optical switch. In FIG. 3, a controller 30 includes an electrostatic actuator driving circuit and, in response to a switching instruction from an external source, not shown, provides a switching drive signal to an electrostatic actuator 80 of the optical switch 70 to control normal driving of the optical switch 70, or provides vibration excitation signal that generates a micro vibration of a moving part 60 of the optical switch according to the present embodiment to the electrostatic actuator 80, thereby controlling driving operation for failure diagnosis. The electrostatic actuator 80 of the optical switch 70 is also used as a sensor, namely vibration detecting means. Information about a micro vibration of the moving part 60 is sent from the vibration detecting means to a dynamic-characteristic analyzing unit 90. The dynamic-characteristic analyzing unit 90 analyzes the micro vibration, sends data obtained through the analysis to the operation unit 10 and also stores it in a memory 100. This process is repeated and the operation unit 110 consistently compares the latest data obtained through the analysis of the micro vibration sent from the dynamic-characteristic analyzing unit 90 with the previous data stored in the memory 100 and calculates and outputs the difference between them. A failure diagnosis unit 120 monitors the difference output and compares it with a preset threshold. If the failure diagnosis unit 120 detects a difference exceeding the threshold, that is, if it detects a drastic change in the vibration characteristics of the moving part 60 of the optical switch 70, then it determines that a failure is occurring. The device configuration of the optical switch 70 and the provision of the controller 30 are basically the same as those of conventional optical switches. The present invention exists only in signal processing performed by the dynamic-characteristic analyzing unit 90 and the subsequent processing, starting with sensing of a micro vibration by vibration detecting means, which is part of the electrostatic actuator 80, and in control by the controller 30 in some embodiments as will be described later.

Figure 4:
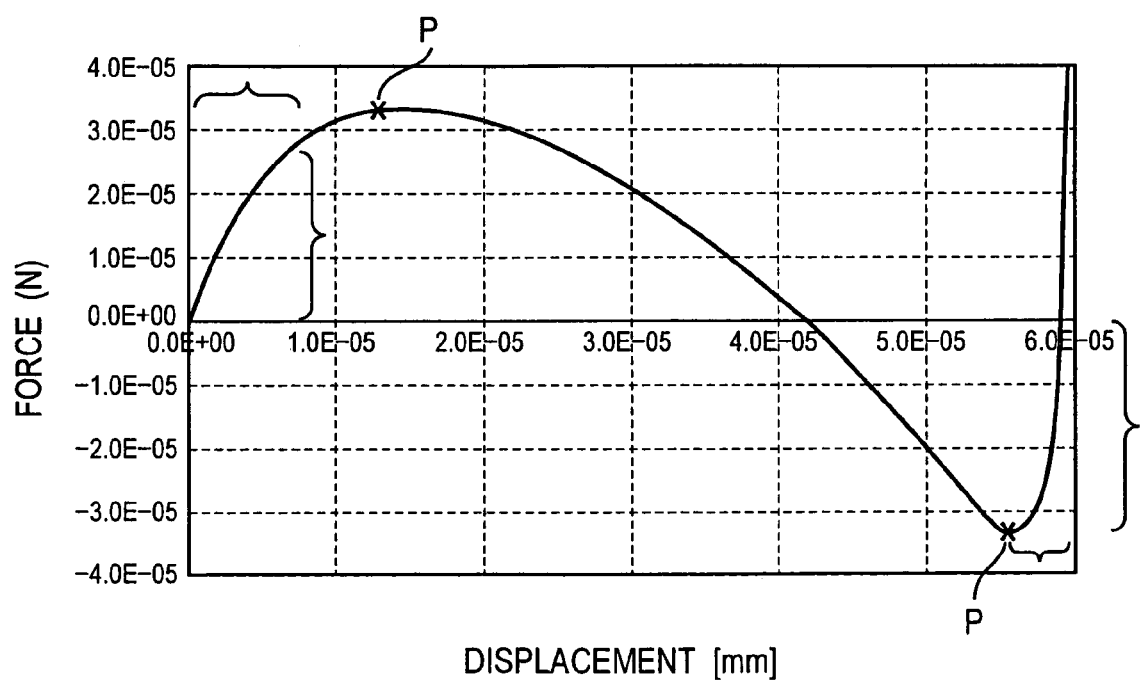
FIG. 4 is a graph of displacement versus force characteristic of a optical switch in a stable state.

The blocks in FIG. 3 will be described below in detail. In a first embodiment of the present invention, the controller 30 controls normal driving of the optical switch 70 in order to placing the optical switch 70 to a first or second stable state, and also controls driving for failure diagnosis in order to generate vibration excitation signal to actively exciting a micro vibration of the operating part of the optical switch 70. In the intrinsic, normal driving, a rectangular-wave constant voltage is applied to a (first or second) fixed electrode of the electrostatic actuator 80 as a switching drive signal from the controller 30. Leaf-spring hinges 6A, 6B and 6C, 6D that support the moving part of the optical switch as shown in FIG. 2 preferably have a bistable displacement/force characteristic as shown in FIG. 4 The bistable characteristic shown in FIG. 4 indicates that a fist stable state is self-retained with the help of the retention force caused by deflection of the leaf-spring hinges 6A, 6B, and 6C, 6D toward one side, a second stable state is self-retained with the help of the retention force caused by deflection of the leaf-spring hinges 6A, 6B and 6C, 6D toward the other side, and the transition between the first and second stable states is caused by exerting electrostatic attraction of the electrostatic actuator that exceeds the retention force retaining the first stable state or the second stable state. Therefore, the switching drive signal must have a voltage high enough for producing an electrostatic attraction of the electrostatic actuator that exceeds point P in the characteristics in FIG. 4, which is the peak (retention force) of the reaction force of the bistable leaf-spring hinges, and the voltage is applied for a period of time required for completing operation for causing the force to exceed point P. An embodiment accomplished by the inventor shows that a voltage of 70 V should be applied for a period approximately equal to a pulse width of 10 msec. The controller 30 generates the switching drive signal in response to a switching drive instruction from an external source. Except during switching operation, the moving part of the optical switch is in the first or second stable state. The controller 30 therefore may generate the vibration excitation signal for failure diagnosis in a time period other than the duration for which the switching drive signal is being generated. For example, the controller 30 may constantly generate the vibration excitation signal for failure diagnosis except while the switching drive signal is being generated. Alternatively, the controller 30 may generate the vibration excitation signal at appropriate intervals. The frequency with which the optical switch switching drive signal is generated varies depending on specific use of the optical switch 70. For example, the instruction may be issued frequently in ROADM systems in which the same communication lines are shared in a wavelength or time division manner whereas in redundant systems in which a production system and a backup system are used, the switching drive instruction is issued upon a failure recovery or maintenance or inspection after a long period of time for which the backup system is idle. The vibration excitation signal may be generated when appropriate in accordance with the use of the optical switch, except during a switching period.

Figure 5:
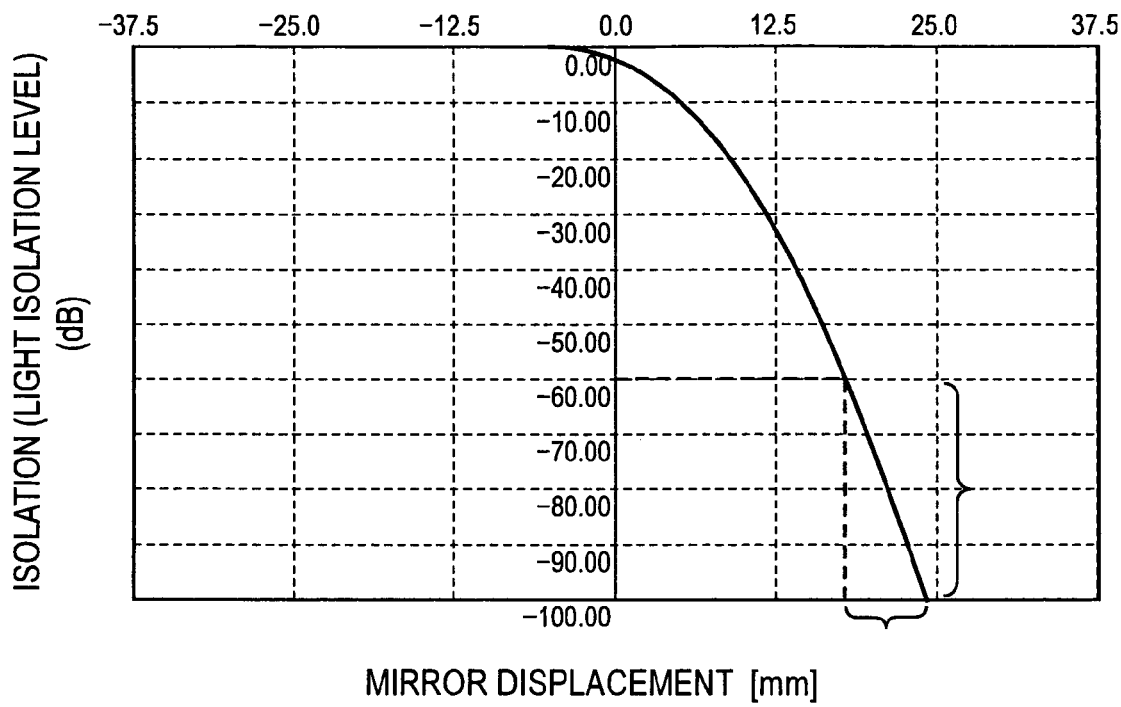
FIG. 5 is a graph of displacement versus light isolation characteristic of the optical switch.

On the other hand, the vibration excitation signal for failure diagnosis should firstly have a level that does not cause the electrostatic attraction that exceeds point P and the characteristics preferably be within a linear region, and secondly should not have a significant effect on the optical characteristics of the device that are required in the first and second stable states if the device is a optical switch. It is important that the micro variation for failure diagnosis in the present embodiment is small enough for ensuring re-coupling of reflected light into an optical fiber under the micro vibration in the first stable state in which the mirror 4 is inserted and does not block transmitted light in the second stable state in which the mirror 4 is retracted. The optical performance of the optical switch is specified in performance specifications such that referring to FIG. 1, for example, signal light is coupled to and passed to the Drop port at an appropriate coupling ratio even when the signal light is input only from the optical fiber of the Input port in a state where the mirror 4 is inserted in the cross waveguide portion 14, and that typically a minute amount of scattered light is coupled to the other ports, namely the Output port and Add port, and that the amount is sufficiently small. In addition, specifications for all coupling efficiencies concerning the ports in both first and second stable states are defined and the amplitude of micro vibration according to the present invention should be within a permissible range specified in the specifications. In particular, the specifications concerning the optical characteristics must specify a small amplitude equivalent to a displacement of a moving part such that variations in the amount of light is less than 60 dB, for example, that meets the needs of a user of the optical switch for optical isolation, as in the displacement-optical isolation characteristic shown in FIG. 5. In practice, the small amplitude is determined by parameters such as the size of the mirror 4, the size of the spot of light illuminating the mirror 4, and the angle of the light beam. In an embodiment accomplished by the inventor, when the stroke of normal switching drive of the mirror 4 is 50-odd μm, there is a margin of several μm in each of the two stable states as the permissible range mentioned above. When a micro vibration amplitude in this permissible range is chosen, preferable failure diagnosis can be accomplished in which the amplitude meets all conditions. In an example of a optical switch implemented by the inventor, a voltage of approximately 40 V is required for the vibration excitation signal supplied from the controller 30 in order to obtain the amplitude of micro vibration that falls within this range. In spite of the fact that the distance traveled by the moving part significantly differs from that in the switching of the optical switch by normal driving, the voltage of the drive signal is the order of 70 V, which is the voltage of the switching drive signal given above, because of the characteristics of reaction force of the bistable hinges.

The frequency of the micro vibration will be described below. In order to most sensitively detect variations in the dynamic characteristics of a moving part of a device for the purpose of failure diagnosis, it is ideal to use the resonant frequency of the moving part. The mechanical resonant frequency of a moving part can be found during a design stage of the device or through preliminary experiments. Excitation of micro vibration according to the present invention may be performed at the resonant frequency or a certain frequency approximately equal to the resonant frequency that provides a sufficient excitation effect. By choosing a frequency in the range between a resonant frequency at or near the resonance point and the frequency at which the power of vibration drops 3 dB, a sufficient excitation can be obtained and preferable failure diagnosis can be accomplished. Alternatively, a micro vibration may be excited by frequency sweeping in an appropriate frequency range including the resonance point, rather than using a constant frequency. In this case, preferably the vibration excitation signal for causing micro vibration is repeatedly swept in the range between 10 Hz and 10 kHz, for example, continuously or at intervals except in periods in which the switching drive signal is generated, as described above. Alternatively, vibration may be excited by applying an impulse signal to the moving part as the vibration excitation signal, rather than frequency control, except in periods in which the switching drive signal is generated. An impulse input excites a damped vibration that contains many frequency components which can be used for the excitation. Analysis of the dynamic characteristics of the moving part with respect to these forms of vibration excitation signal will be described later.

Normal switching of the optical switch is driven by using a short pulse signal with a rectangular waveform as described above. The switching drive signal also contains many frequency components, including those sufficiently close to the resonant frequency of the moving part. In a second embodiment of the present invention, failure diagnosis can be accomplished by using a damped vibration excited only by normal switching drive by the controller 30 as the micro vibration for failure diagnosis, rather than separately generating vibration excitation signal by the controller 30 as in the first embodiment. While this embodiment is not suitable for highly sensitive failure diagnosis because the amplitudes of available micro vibrations are small, it has an advantage that failure diagnosis can be accomplished conveniently in a device driving phase with a conventional-art configuration without making modifications.

In a third embodiment of the present invention, a stopper arrangement which is often used in conventional optical switches or other switching MEMS devices is used. In particular, for example, a optical switch includes mechanical stoppers 7S1 and 7S2 as shown in FIG. 2 as extensions of the width of a movable rod 7 as mentioned above and shown in FIG. 2. In conventional optical switches, it is rare that switching driving causes such stoppers to actually collide against a wall of the anchor. They are provided mainly for the purpose of avoiding shock. According to the present invention, an increased voltage of a switching drive signal for the optical switch is used to drive the stoppers to cause a collision each time switching drive is performed. A damped vibration caused by the collision can be used as the micro vibration for failure diagnosis. In the third embodiment, the intensity of the collision of the stopper should be such that the amplitude of a micro vibration caused by the collision falls within the range specified by the optical characteristics specification described above. Conditions for the voltage of the switching drive signal for meeting this requirement can be readily determined through experiment.

Excitation of a micro vibration of a moving part for failure diagnosis according to the present invention has been described. A process for detecting and analyzing the micro vibration to diagnose a failure will be described below.

Figure 6:
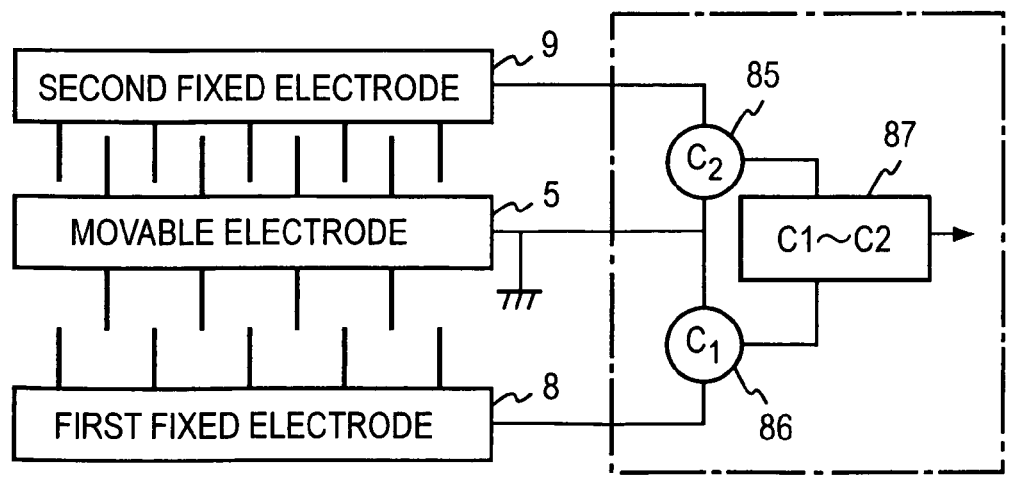
FIG. 6 is a block diagram showing electrodes including a dynamic characteristic sensor.

Vibration detecting means for detecting a micro vibration of a moving part used for the present invention may be some kind of displacement sensor added to the MEMS device for detecting displacements of the moving part of the MEMS device, of course. However, if the MEMS device is an electrostatic-driven device, the best way is to use its electrostatic actuator as a capacitance-operated displacement sensor. In the example of the optical switch described above, a displacement of the movable electrode 5, namely a vibration of the moving part, can be detected by detecting capacitances C1 and C2 formed between the movable electrode 5 and the first fixed electrode 8 and between the movable electrode 5 and the second fixed electrode 5, respectively. This configuration is shown in FIG. 6. Using a push-pull electrostatic actuator having two fixed electrodes as shown in this example, the sensitivity of displacement detection can be further increased by obtaining by means of a comparator 87 the difference between the capacitances C1 and C2 detected by detectors 85 and 86. A signal representing a vibration of the moving part 60 is extracted from the vibration detecting means 80, which also acts as an electrostatic actuator, and the signal is sent to the dynamic-characteristic detecting means 90.

Figure 7A:
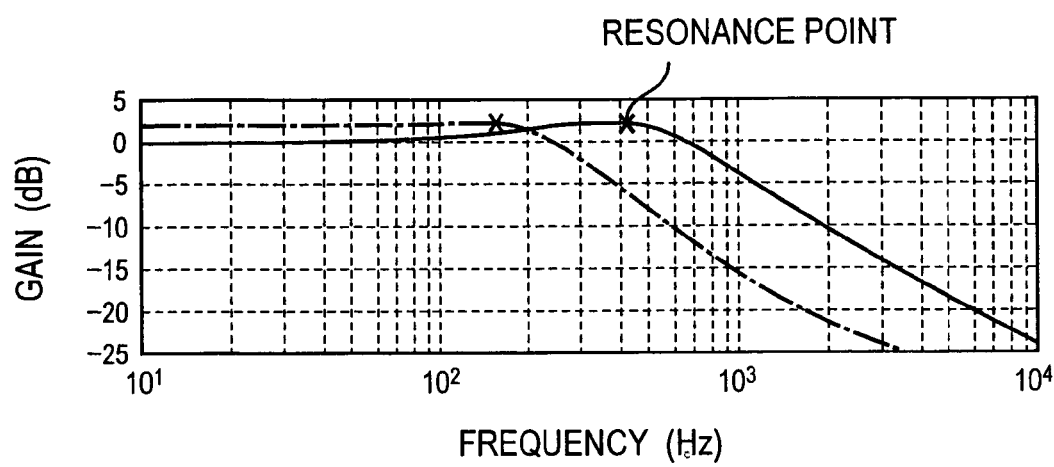
FIGS. 7A and 7B are waveform charts showing examples of response characteristics.
Figure 7B:
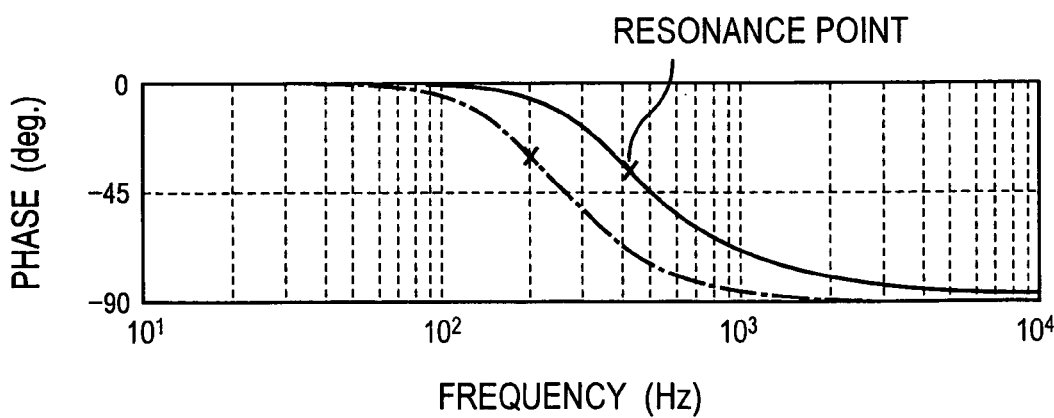

In the dynamic-characteristics detecting means 90, information concerning the transfer function of vibration of the moving part of the MEMS device is extracted. Specifically, when the controller 30 in the first embodiment of the present invention excites a micro vibration with a certain frequency, the controller 30 analyzes, from a signal representing the vibration of the moving part 60 that can be obtained from the vibration detecting means 80, either of the amplitude of the vibration or a phase delay with respect to a vibration excitation signal sent by the controller 30, or both if an improvement of the sensitivity of failure diagnosis is desired, and the resulting data is outputted. In the first embodiment in which the controller 30 excites a vibration by performing frequency sweep, or in the second or third embodiment, that is, when the frequency components of the micro vibration excited are distributed over a certain range, preferably the frequency response characteristic of the excited micro vibration is analyzed. The amplitude and phase frequency response characteristic may be as shown in FIGS. 7A and 7B. One of the characteristics or, if a high sensitivity of failure diagnosis is desired, both of them may be analyzed and outputted, and the values of the amplitude/phase with each of the frequencies into which the frequency range is divided as appropriate may be used as data in comparison in the subsequent stage. Alternatively, the Q value relating to a resonance point in the response characteristics may be analyzed and outputted, and used as the data. Alternatively, the integral of the gains may be obtained and used to analyze and output the energy of vibration and the output may be used as the data. Of course, more than one of the items of data mentioned above may be used concurrently in order to further improve the accuracy of failure diagnosis. FIG. 7A shows an example of gain change versus frequency change and FIG. 7B shows an example of phase change versus frequency change. In these figures, symbol X indicates a resonance point, and the characteristic represented by the alternate long and short dashed line and the characteristics represented by the solid line illustrate a normal vibration and a faulty vibration, respectively.

Then, a determining unit consisting of the operation unit 110 and the failure diagnosis unit 120 performs failure diagnosis. In particular, the response characteristics obtained in the dynamic-characteristic analyzing unit 90 are stored in the memory 100 in sequence and in the operation unit 110 the latest response characteristic obtained in the dynamic-characteristic analyzing unit 90 is compared with the immediately previous response characteristic stored in the memory. That is, the difference between the data provided by the dynamic-characteristic analyzing unit 90 is obtained.

The failure diagnosis unit 120 determines whether or not the difference between the data obtained by the operation unit 110 is greater than a threshold to determine whether there is a failure. A change in the response characteristics indicates a change in the mechanical characteristics of the moving part. Therefore, the amount of change from the previous value is compared with a predetermined threshold and, if the amount of change is greater than the threshold, it is determined that a mechanical abnormality, namely a failure, is occurring. The threshold for the data used can be determined appropriately according to the use of the device through experiment. According to the present embodiment, data concerning the response characteristics of the moving part is always compared with the data obtained through the previous analysis, and only if a drastic change in data used is found, it is determined that a failure is occurring. In the case of a normal, gradual change in the response characteristics, the failure diagnosis according to the present embodiment does not sense that a failure is occurring even if the amount of change is large.

While the present invention has been described with respect to a optical switch as an example of MEMS devices, the present invention can be used for failure diagnosis of any MEMS device that switches between two states. For example, the present invention can be applied to failure diagnosis of devices such as relays. In this case, the diagnosis signal has an amplitude in a range that does not affect the performance of the relay.

What is claimed is:

1. A microelectromechanical systems device comprising:
   a substrate;
   a moving part, a fixed part, and an actuator that displaces said moving part, all of which being formed on said substrate;
   a control unit which drives said actuator to switch the position of moving part between binary states;
   vibration detecting means for detecting a micro vibration excited in said moving part in one of said binary switching states;
   a dynamic-characteristic analyzing means for analyzing a dynamic-characteristic of said moving part on the basis of an output from said vibration detecting means;
   a memory which stores data outputted from said dynamic-characteristic analyzing means;
   an operation unit which retrieves data from said memory, compares two temporally successive pieces of data, and calculates difference information between said two pieces of data; and
   a failure diagnosis unit which performs a failure diagnosis based on said difference information outputted from said operation unit.

2. The microelectromechanical systems device according to claim 1, wherein:
   said actuator is an electrostatic actuator comprising a movable electrode provided on said moving part and a fixed electrode provided on said fixed part, said movable and fixed electrodes being opposed to each other; and
   said vibration detecting means detects a vibration of electrostatic capacitance formed by said movable electrode and said fixed electrode of said electrostatic actuator.

3. The microelectromechanical systems device according to claim 1 or 2, wherein:
   said microelectromechanical systems device is a optical switch which drives a mirror provided on said moving part to switch between two positions in which said mirror is inserted in or retracted from an aerial light path formed between ends of a plurality of optical fibers provided in said fixed part; and the amplitude of said micro vibration of said moving part is in a range in which the optical coupling ratios of all pairs of ends of said plurality of optical fibers in one of said binary switching states in which said micro vibration is generated meets specifications.

4. The microelectromechanical systems device according to claim 1 or 2, wherein:

said control unit provides vibration excitation signal for exciting said micro vibration in said moving part to said actuator when said moving part is one of said binary switching states.

5. The microelectromechanical systems device according to claim 4, wherein:

said microelectromechanical systems device is a optical switch which drives a mirror provided on said moving part to switch between two positions in which said mirror is inserted in or retracted from an aerial light path formed between ends of a plurality of optical fibers provided in said fixed part; and the amplitude of said micro vibration of said moving part is in a range in which the optical coupling ratios of all pairs of ends of said plurality of optical fibers in one of said binary switching states in which said micro vibration is generated meets specifications.

6. The microelectromechanical systems device according to claim 4, wherein said vibration excitation signal is a constant-frequency signal in a frequency region in which vibration power in a resonance frequency characteristic of said moving part is at least the mesial magnitude of a resonance peak value.

7. The microelectromechanical systems device according to claim 6, wherein:

said microelectromechanical systems device is a optical switch which drives a mirror provided on said moving part to switch between two positions in which said mirror is inserted in or retracted from an aerial light path formed between ends of a plurality of optical fibers provided in said fixed part; and the amplitude of said micro vibration of said moving part is in a range in which the optical coupling ratios of all pairs of ends of said plurality of optical fibers in one of said binary switching states in which said micro vibration is generated meets specifications.

8. The microelectromechanical systems device according to claim 4, wherein said vibration excitation signal repeats a frequency sweep in a predetermined frequency range.

9. The microelectromechanical systems device according to claim 8, wherein:

said microelectromechanical systems device is a optical switch which drives a mirror provided on said moving part to switch between two positions in which said mirror is inserted in or retracted from an aerial light path formed between ends of a plurality of optical fibers provided in said fixed part; and the amplitude of said micro vibration of said moving part is in a range in which the optical coupling ratios of all pairs of ends of said plurality of optical fibers in one of said binary switching states in which said micro vibration is generated meets specifications.

10. The microelectromechanical systems device according to claim 8, wherein said dynamic-characteristic analyzing unit outputs and stores in said memory at least any of data on a frequency response characteristic of the amplitude or phase of said micro vibration of said moving part, data on a Q value relating to a resonance frequency of a frequency response characteristic of said amplitude, and data on the magnitude of vibration energy.

11. The microelectromechanical systems device according to claim 10, wherein:

said microelectromechanical systems device is a optical switch which drives a mirror provided on said moving part to switch between two positions in which said mirror is inserted in or retracted from an aerial light path formed between ends of a plurality of optical fibers provided in said fixed part; and the amplitude of said micro vibration of said moving part is in a range in which the optical coupling ratios of all pairs of ends of said plurality of optical fibers in one of said binary switching states in which said micro vibration is generated meet specifications.

12. The microelectromechanical systems device according to claim 4, wherein said vibration excitation signal is an impulse signal and said micro vibration of said moving part detected by said vibration detecting means is a damped vibration of said moving part induced by application of said impulse signal.

13. The microelectromechanical systems device according to Claim 12, wherein:

said microelectromechanical systems device is a optical switch which drives a mirror provided on said moving part to switch between two positions in which said mirror is inserted in or retracted from an aerial light path formed between ends of a plurality of optical fibers provided in said fixed part; and the amplitude of said micro vibration of said moving part is in a range in which the optical coupling ratios of all pairs of ends of said plurality of optical fibers in one of said binary switching states in which said micro vibration is generated meet specifications.

14. The microelectromechanical systems device according to claim 12, wherein said dynamic-characteristic analyzing unit outputs and stores in said memory at least any of data on a frequency response characteristic of the amplitude or phase of said micro vibration of said moving part, data on a Q value relating to a resonance frequency of a frequency response characteristic of said amplitude, and data on the magnitude of vibration energy.

15. The microelectromechanical systems device according to claim 14, wherein:

said microelectromechanical systems device is a optical switch which drives a mirror provided on said moving part to switch between two positions in which said mirror is inserted in or retracted from an aerial light path formed between ends of a plurality of optical fibers provided in said fixed part; and the amplitude of said micro vibration of said moving part is in a range in which the optical coupling ratios of all pairs of ends of said plurality of optical fibers in one of said binary switching states in which said micro vibration is generated meets specifications.

16. The microelectromechanical systems device according to claim 1 or 2, wherein said micro vibration of said moving part detected by said vibration detecting means is a damped vibration induced by said binary switching of said moving part.

17. The microelectromechanical systems device according to claim 16, wherein:

said microelectromechanical systems device is a optical switch which drives a mirror provided on said moving part to switch between two positions in which said mirror is inserted in or retracted from an aerial light path formed between ends of a plurality of optical fibers provided in said fixed part; and the amplitude of said micro vibration of said moving part is in a range in which the optical coupling ratios of all pairs of ends of said plurality of optical fibers in one of said binary switching states in which said micro vibration is generated meets specifications.

18. The microelectromechanical systems device according to claim 16, wherein said dynamic-characteristic analyzing unit outputs and stores in said memory at least any of data on a frequency response characteristic of the amplitude or phase of said micro vibration of said moving part, data on a Q value relating to a resonance frequency of a frequency response characteristic of said amplitude, and data on the magnitude of vibration energy.

19. The microelectromechanical systems device according to claim 18, wherein:

said microelectromechanical systems device is a optical switch which drives a mirror provided on said moving part to switch between two positions in which said mirror is inserted in or retracted from an aerial light path formed between ends of a plurality of optical fibers provided in said fixed part; and the amplitude of said micro vibration of said moving part is in a range in which the optical coupling ratios of all pairs of ends of said plurality of optical fibers in one of said binary switching states in which said micro vibration is generated meets specifications.

20. The microelectromechanical systems device according to claim 1 or 2, a stopper arrangement is provided on each of said moving part and said fixed part, said stopper arrangement limiting the range of movement of said moving part by collision between a portion of said moving part and a portion of said fixed part, and said micro vibration of said moving part detected by said vibration detecting means is a damped vibration induced by collision of said stopper arrangement caused upon said binary switching of said moving part.

21. The microelectromechanical systems device according to claim 20, wherein:

said microelectromechanical systems device is a optical switch which drives a mirror provided on said moving part to switch between two positions in which said mirror is inserted in or retracted from an aerial light path formed between ends of a plurality of optical fibers provided in said fixed part; and the amplitude of said micro vibration of said moving part is in a range in which the optical coupling ratios of all pairs of ends of said plurality of optical fibers in one of said binary switching states in which said micro vibration is generated meet specifications.

22. The microelectromechanical systems device according to claim 20, wherein said dynamic-characteristic analyzing unit outputs and stores in said memory at least any of data on a frequency response characteristic of the amplitude or phase of said micro vibration of said moving part, data on a Q value relating to a resonance frequency of a frequency response characteristic of said amplitude, and data on the magnitude of vibration energy.

23. The microelectromechanical systems device according to claim 22, wherein:

said microelectromechanical systems device is a optical switch which drives a mirror provided on said moving part to switch between two positions in which said mirror is inserted in or retracted from an aerial light path formed between ends of a plurality of optical fibers provided in said fixed part; and the amplitude of said micro vibration of said moving part is in a range in which the optical coupling ratios of all pairs of ends of said plurality of optical fibers in one of said binary switching states in which said micro vibration is generated meet specifications.

24. The microelectromechanical systems device according to claim 6, wherein said dynamic-characteristic analyzing unit outputs and stores in said memory at least either of data on the amplitude of said micro vibration of said moving part or data on a phase delay with respect to said vibration excitation signal.

25. The microelectromechanical systems device according to claim 24, wherein:

said microelectromechanical systems device is a optical switch which drives a mirror provided on said moving part to switch between two positions in which said mirror is inserted in or retracted from an aerial light path formed between ends of a plurality of optical fibers provided in said fixed part; and the amplitude of said micro vibration of said moving part is in a range in which the optical coupling ratios of all pairs of ends of said plurality of optical fibers in one of said binary switching states in which said micro vibration is generated meet specifications.

* * * * *